United States Patent
Cohen et al.

(10) Patent No.: US 8,005,945 B2
(45) Date of Patent: Aug. 23, 2011

(54) AGGREGATING POLICY CRITERIA PARAMETERS INTO RANGES FOR EFFICIENT NETWORK ANALYSIS

(75) Inventors: Alain J. Cohen, McLean, VA (US); Pradeep K. Singh, Arlington, VA (US); Ankit Agarwal, Bethesda, MD (US); Venuprakash Barathan, Chevy Chase, MD (US)

(73) Assignee: OPNET Technologies, Inc., Bethesda, MD (US)

( * ) Notice: Subject to any disclaimer, the term of this patent is extended or adjusted under 35 U.S.C. 154(b) by 448 days.

(21) Appl. No.: 11/735,474

(22) Filed: Apr. 15, 2007

(65) Prior Publication Data
US 2007/0282981 A1 Dec. 6, 2007

Related U.S. Application Data

(60) Provisional application No. 60/803,765, filed on Jun. 2, 2006.

(51) Int. Cl.
*G06F 15/173* (2006.01)
*G06F 15/177* (2006.01)

(52) U.S. Cl. .......... 709/224; 709/220; 709/223
(58) Field of Classification Search .......... 709/203, 709/225, 220, 223–224
See application file for complete search history.

(56) References Cited

U.S. PATENT DOCUMENTS

| | | | | |
|---|---|---|---|---|
| 6,578,074 | B1 * | 6/2003 | Bahlmann | 709/220 |
| 6,587,466 | B1 * | 7/2003 | Bhattacharya et al. | 370/395.21 |
| 6,611,863 | B1 * | 8/2003 | Banginwar | 709/220 |
| 6,857,018 | B2 * | 2/2005 | Jiang | 709/225 |
| 7,020,082 | B2 * | 3/2006 | Bhagavath et al. | 370/230 |
| 7,315,541 | B1 * | 1/2008 | Housel et al. | 370/392 |
| 7,509,408 | B2 * | 3/2009 | Kurita | 709/223 |

* cited by examiner

*Primary Examiner* — Hussein A Elchanti
(74) *Attorney, Agent, or Firm* — Robert M. McDermott, Esq

(57) ABSTRACT

A network configuration is processed to identify each policy and the criteria associated with each policy. The criteria of the policies are processed to identify a non-overlapping set of ranges of the criteria parameter, each range being associated with a particular policy or set of policies. In a preferred embodiment, the criteria include the protocol, the source and destination IP addresses, and the source and destination ports, and a default range is defined for each criteria parameter.

29 Claims, 4 Drawing Sheets

Table 450:

| Range | Combined set | FW1 | FW2 | FW3 | FW4 |
|---|---|---|---|---|---|
| R1 | 0.0.0.0 – 9.255.255.255 | | | | |
| R2 | 10.0.0.0-10.0.255.255 | | | | 10.*.*.* |
| R3 | 10.1.0.0-10.1.255.255 | 10.*.*.* | 10.*.*.* | 10.*.*.* | 10.1.*.* |
| R4 | 10.2.0.0-10.255.255.255 | | | | 10.*.*.* |
| R5 | 11.0.0.0-172.15.255.255 | | | | |
| R6 | 172.16.0.0-172.16.255.255 | 172.16.*.* | 172.16.*.* | 172.16.*.* | 172.16.*.* |
| R7 | 172.17.0.0-192.167.255.255 | | | | |
| R8 | 192.168.0.0-192.168.255.255 | 192.168.*.* | 192.168.*.* | 192.168.*.* | 192.168.*.* |
| R9 | 192.169.0.0-255.255.255.255 | | | | |

Table 460:

| Range | Combined set | FW1 | FW2 | FW3 | FW4 |
|---|---|---|---|---|---|
| R1 | 0.0.0.0 – 9.255.255.255 | | | | |
| R2 | 10.0.0.0-10.0.255.255 | | | | |
| R3 | 10.1.0.0-10.1.9.255 | | | | |
| R4 | 10.1.10.0-10.1.10.9 | | | | 10.1.10.* |
| R4 | 10.1.10.10 | | | | 10.1.10.10 |
| R5 | 10.1.10.11-10.1.255.255 | | | | 10.1.10.* |
| R6 | 10.2.0.0-10.34.255.255 | 10.*.*.* | 10.*.*.* | 10.*.*.* | |
| R7 | 10.35.0.0-10.35.19.255 | | | | 10.35.*.* |
| R8 | 10.35.20.1 | | | | 10.35.20.1 |
| R9 | 10.35.20.1-10.35.255.255 | | | | 10.35.*.* |
| R10 | 10.36.0.0-10.255.255.255 | | | | |
| R11 | 11.0.0.0-192.167.255.255 | | | | |
| R12 | 192.168.0.0-192.168.1.255 | 192.168.*.* | | | |
| R13 | 192.168.2.0-192.168.2.5 | 192.168.2.* | | | |
| R14 | 192.168.2.6 | 192.168.2.6 | | | |
| R15 | 192.168.2.7-192.168.2.255 | 192.168.2.* | 192.168.*.* | 192.168.*.* | 192.168.*.* |
| R16 | 192.168.3.0-192.168.99.255 | 192.168.*.* | | | |
| R17 | 192.168.100.1 | 192.168.100.1 | | | |
| R18 | 192.168.100.2-192.168.255.255 | 192.168.*.* | | | |
| R19 | 192.169.0.0-255.255.255.255 | | | | |

Table 470:

| Range | Combined set | FW1 | FW2 | FW3 | FW4 |
|---|---|---|---|---|---|
| R1 | 0-24 | * | | | * |
| R2 | 25 | 25 | | | |
| R3 | 26-79 | * | | | |
| R4 | 80 | 80 | | | 80 |
| R5 | 81-440 | | * | | * |
| R6 | 441 | * | | | 441 |
| R7 | 442-1023 | | | | * |
| R8 | 1024-8079 | | | | |
| R9 | 8080 | 8080 | | 8080 | >1024 |
| R10 | 8081-2^16 | * | | * | |

FIG. 4B

AGGREGATING POLICY CRITERIA PARAMETERS INTO RANGES FOR EFFICIENT NETWORK ANALYSIS

This application claims the benefit of U.S. Provisional Patent Application 60/803,765, filed 2 Jun. 2006.

BACKGROUND AND SUMMARY OF THE INVENTION

This invention relates to the field of network analysis, and in particular to a method and system for aggregating traffic flow policy parameters into a set of ranges that facilitate efficient network analysis.

Network Analysis has become an important aspect of information technology either in terms of evaluating the current state of network health, or predicting future network behavior. The behavior of a network is largely determined by the configuration on each of the network elements. The configuration defines the behavior of the network element for different types of data traffic that pass through it. The configuration includes, for example, a firewall access control policy, a traffic routing policy, a QoS (Quality of Service) policy, and so on. These policies generally define a distinct behavioral characteristic for each different group of related data traffic, such as traffic between particular nodes. The selection criteria include, for example, IP addresses, Ports, or some special bits on the data packet.

A comprehensive network analysis requires analysis and verification of the behavior of the network for each combination of the individual traffic flow characteristics. The verification of all combinations of traffic flow characteristics is generally infeasible; for example, IPv4 uses a 32-bit addressing scheme and the verification of a data flow policy between source and destination IP addresses presents as many as $2^{32}*2^{32}$ unique address pairs for verification. TCP and UDP allow as many as 65,536 ports, further compounding the complexity of evaluating all combinations of traffic flow.

It would be advantageous to segregate the input space of data flow policies into sets of discrete ranges such that the network behavior is the same for all data points within each range. It would be advantageous to minimize the number of discrete ranges in each set to reduce the number of combinations that need to be verified for a given data flow policy.

These advantages, and others, can be realized by a method and system that processes the network configuration to identify each policy and the criteria associated with each policy. Each criteria of the policies is processed to identify a non-overlapping set of ranges, each range being associated with a particular policy or set of policies. In a preferred embodiment, the criteria include the protocol, the source and destination IP addresses, and the source and destination ports, and a minimal set of ranges is defined for each criteria.

BRIEF DESCRIPTION OF THE DRAWINGS

The invention is explained in further detail, and by way of example, with reference to the accompanying drawings wherein:

FIGS. 4A-4B illustrate another example network with configuration/policy tables, and resultant policy-dependent ranges in accordance with this invention.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The examples used to illustrate the principles of this invention are provided in the context of IP addressing, wherein the criteria used to define data-flow policies include the parameters of: protocol, source and destination addresses, and source and destination ports. One of ordinary skill in the art will recognize that the invention is not limited to IP addressing, and not limited to the particular set of criteria parameters used in the examples used herein. Similarly, the invention is presented in the context of firewalls, and thus the example data-flow policies are limited to the option of permit or deny, although one of skill in the art will recognize that a data-flow policy is any policy that affects the propagation of the current message or subsequent messages. For example, a QoS policy can be based on the delays experienced by prior messages, to increase or decrease the allocation of bandwidth for transmitting subsequent messages, to redefine a routing path to avoid bottlenecks, and so on.

Figure 1:
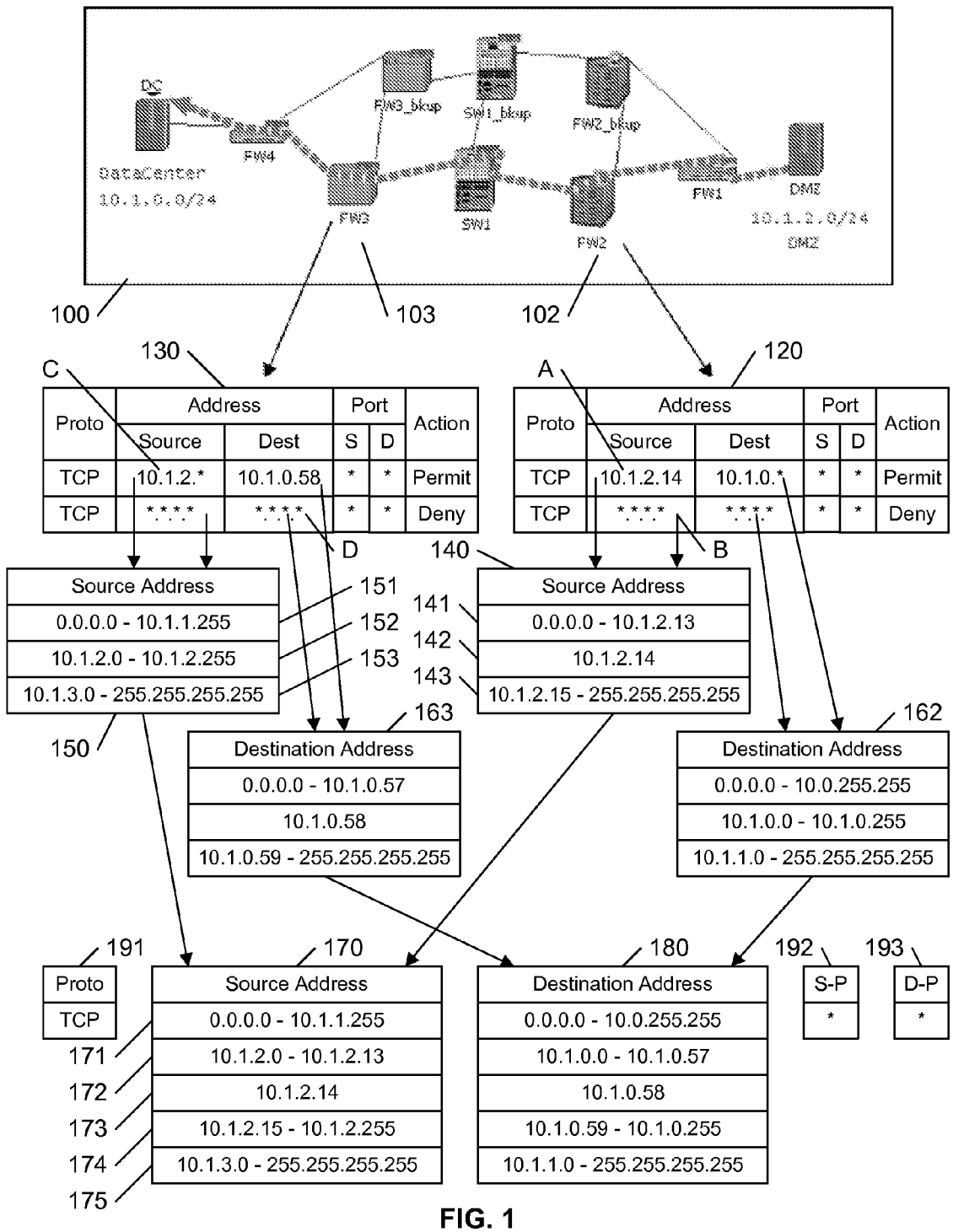
FIG. 1 illustrates an example network with configuration/policy tables, and resultant policy-dependent ranges in accordance with this invention.

FIG. 1 illustrates an example network 100 that includes devices 102 and 103 having firewalls FW2 and FW3 defined by configuration tables 120 and 130, respectively. Preferably, the configuration data is obtained directly from the configured devices, but any of a variety of techniques may be used to create the configuration data, including allowing the user to define the proposed configuration. In an example embodiment, a user may define the proposed configuration, and after the proposed configuration is verified, the verified configuration is downloaded to one or more devices in the network, or compared with existing configurations to verify compliance.

Firewall FW2 indicates that messages from a source with an IP address of 10.1.2.14 to a destination with an IP address of 10.1.0.* are permitted to pass through the firewall, and all others are denied/blocked. The asterisk * in the above destination address corresponds to a range of 0-255 in the fourth address field, and the permitted destination address 10.1.0.* can be alternatively expressed as "10.1.0.0-255" or "10.1.0.0-10.1.0.255". In like manner the denied destination addresses "*.*.*.*" can be represented as "0.0.0.0-255.255.255.255", which is the typical default configuration of a firewall.

Using the letters A and B to represent the source address criteria 10.1.2.14 and *.*.*.*, respectively, and policyA and policyB associated with these addresses as defined in the configuration table 120, the source address space can be segregated into: addresses for which neither policyA nor policyB applies (not(A) and not(B)); addresses for which only policyB applies (not(A) and B); addresses for which only policyA applies (A and not(B)); and addresses for which both policies apply (A and B). For convenience a dash - after a symbol is used hereinafter to indicate "not", and an asterisk * is used to indicate the 'and', or 'intersection' function. That is, the aforementioned source address space can be segregated into four sets: (A-*B-), (A-*B), (A*B-), and (A*B).

Because, in this example, the address space B (*.*.*.*) represents the entirety of the address space, B- corresponds to a null set. Therefore, the address space (A-*B-) and (A*B-) are null. The address space (A*B) corresponds to addresses in A (10.1.2.14), and the address space (A-*B) corresponds to all addresses except those in A, or, addresses (0.0.0.0-10.1.2.13; 10.1.2.15-255.255.255.255). Table 140 illustrates these address spaces arranged in address-order. That is, the first subset of the addresses in set A-*B, 0.0.0.0-10.1.2.13, corresponds to the entry 141; the next-ordered address corresponds to set A*B, 10.1.2.14, entry 142; and the second subset of the addresses in set A-*B, 10.1.2.15-255.255.255.255, corresponds to the entry 143. Addresses within the range of entry 141 correspond to a subset of the addresses for which only policyB (not(A) and B) applies; addresses within the range of entry 142 correspond to the addresses for which only policyA (A and not(B)) applies; and addresses within the range of entry 143 correspond to the other subset of addresses for which only policyB (not(A) and B) applies. As used herein, the term 'range' can apply to only one address, as well as a plurality of addresses. One of ordinary skill in the art will recognize that the use of an ordered list of contiguous addresses is provided for convenience, and that alternative arrangements of policy-dependent sets of addresses may also be used.

In like manner, the source address criteria corresponding to each policy in configuration table 130 produce a set of policy-dependent source address ranges 151, 152, 153. That is, using the letters C and D to represent the source addresses 10.1.2.* and *.*.*.*, respectfully, table 150 includes the possible non-null address sets (C-*D-), (C-*D), (C*D-), and (C*D). The range of addresses in entry 151 corresponds to a subset of the addresses for which the policy of only D (C-*D) applies; the range of addresses in entry 152 corresponds to the addresses for which the policies of both C and D (C*D) apply; and the range of addresses in entry 153 corresponds to other subset of addresses for which the policy of only D (C-*D) applies. The other sets, (C-*D-) and (C*D-) are null sets.

Similarly, tables 162 and 163 represent the policy-dependent address spaces corresponding to the destination address criteria specified in the configuration/policy tables 120 and 130, respectively.

Table 170 corresponds to the combination of policy-dependent source-address tables 140 and 150, and table 180 corresponds to the combination of policy-dependent destination-address tables 162 and 163.

Using the aforementioned letters A, B, C, and D to represent the policy-dependent source address criteria 10.1.2.14, *.*.*.*, 10.1.2.*, and *.*.*.*, respectively, there are sixteen possible policy-dependent sets of addresses: (A-*B-*C-*D-), (A-*B-*C-*D), (A-*B-*C*D-), (A*B*C*D-), (A*B*C*D), some of which are null sets. The non-null sets are (A-*B*C-*D), (A-*B*C*D) and (A*B*C*D), corresponding (0.0.0.0-10.1.1.255; 10.1.3.0-255.255.255.255), (10.1.2.0-10.1.2.13; 10.1.2.15-10.1.2.255), and (10.1.2.14), respectively. Table 170 illustrates these policy-dependent source-ranges, ordered by contiguous address sets. In like manner, table 180 illustrates the policy-dependent destination-ranges, also ordered by contiguous address sets.

The other example criteria parameters (protocol, source and destination ports) of the configuration/policy tables 120 and 130 illustrate the same range regardless of policy, and therefore provide the resultant single-entry policy-dependent tables 191, 192, 193.

As illustrated in this example, there are only five different source-address ranges (table 170; 171-175) and five different destination-address ranges (table 180); therefore, the policies specified in tables 120 and 130 can be verified using as few as 25 (5×5) different source-destination address combinations with a protocol of TCP and any source and destination port, because the same policy or combination of policies will be applied to each of the addresses within each determined range in these tables 170, 180.

Figure 2:
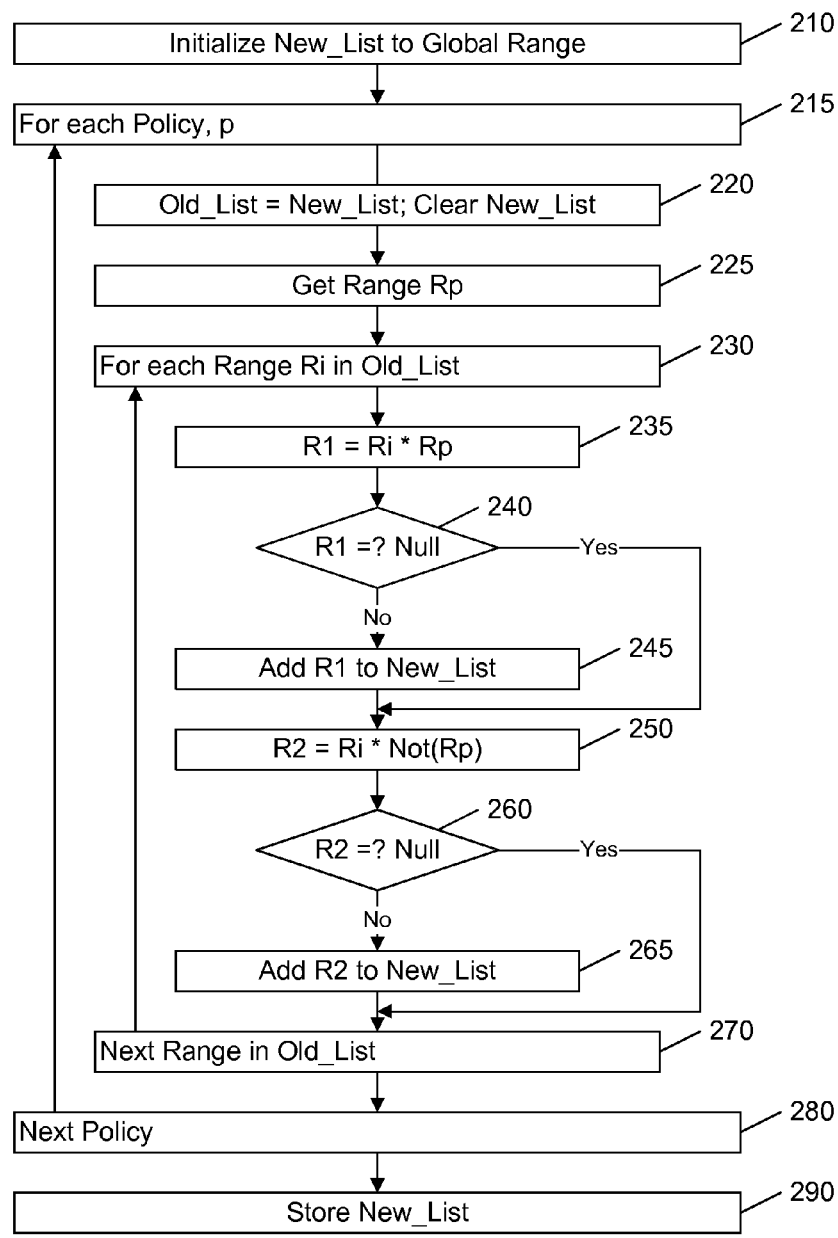
FIG. 2 illustrates an example flow diagram for determining policy-dependent ranges in accordance with this invention.

FIG. 2 illustrates an example flow diagram for producing policy-dependent sets of parameter ranges corresponding to a given set of policies.

The process is initialized at 210. Two lists are used in the process, an 'old' list, representing the sets of ranges produced thus far, and a 'new' list representing the sets of ranges produced by processing each new policy. At 210, the new list is initialized to include the entire range of the parameter being assessed. This range may be pre-defined to a default value for each parameter, such as "0.0.0.0-255.255.255.255" for IP address ranges and "0-65535" for port address ranges, or it may be defined as the union of all the ranges of the parameter in the given policies, such as the set of all the referenced protocols in the given policies.

The loop 215-280 is applied for each new policy, p. At 220, the old list of ranges is set equal to the former new list, and the current new list of ranges is cleared.

At 225, the range of the criteria parameter, Rp, in the new policy, p, is obtained. The effect of this range Rp on the set of ranges in the old list is determined in the loop 230-270. Each new policy has the potential of partitioning the prior ranges into two sets, a first set of ranges that include the current range Rp, and a second set of ranges that do not include the current range Rp. The term 'potential' is used because a 'new' range that is identical to a previously processed range will not effect a new partitioning.

The loop 230-270 is processed for each range, Ri, in the old list. At 235, the intersection R1 of the new range Rp with the current old range Ri is determined. If, at 240, this intersection R1 is not null, this intersection R1 is added to the new list, at 245. In this manner, if the new range Rp is equal to the old range Ri (R1=Ri), the old range Ri is added to the new list; and if the new range Rp is a subset of the old range Ri, this subset (R1=Ri*Rp) is added to the new list. At 250, the intersection R2 of not(Rp) with the current old range Ri is determined. If, at 260, this intersection R2 is not null, this intersection R2 is added to the new list, at 265. In this manner, if the new range Rp does not intersect the old range Ri (R2=Ri), the old range Ri is transferred to the new list; and if the new range Rp is a subset of the old range Ri, the remainder subset of Ri (R2=Ri*not(Rp)) is added to the new list. That is, the loop 230-270 will either move the old range Ri to the new list, or will add two partitions of the old range Ri (Ri*Rp and Ri*not(Rp)) to the new list. If a new range Rp overlaps multiple old ranges Ri, each of the overlapped ranges Ri will be likewise partitioned.

After all of the policies are processed via the loop 215-280, the resultant new list is stored, at 290. Preferably, if the criteria parameter corresponds to an address or port, this list of ranges is stored in numerical order, similar to the illustrated lists 170, 180 in FIG. 1, to facilitate efficient subsequent use of this list in a target analysis/verification tool. Optionally, the addition of new ranges to the new list at 245 and 265 can be an ordered insertion into the list, to avoid storing and processing redundant ranges.

Figure 3:
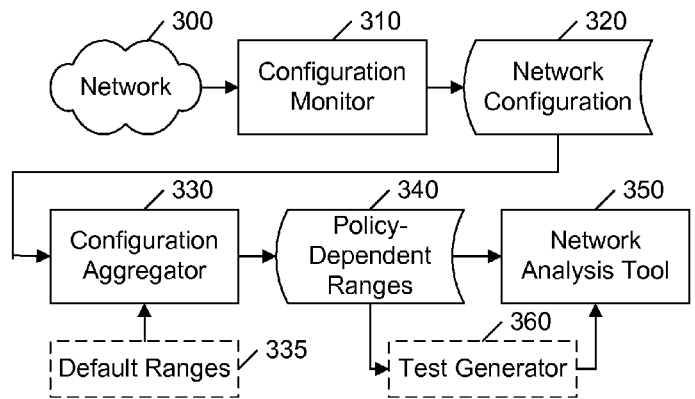
FIG. 3 illustrates an example block diagram of a policy-dependent range determination system in accordance with this invention.

FIG. 3 illustrates an example system that incorporates the principles of this invention.

A configuration monitor 310 is configured to determine the configuration 320 of the components of a target network 300. This monitor 310 may be configured to query the components of an actual network 300 to determine the network configuration 320, or it may be configured to determine the network configuration 320 from a model of a network 300, such as a model that is used to simulate the performance of a network 300.

A configuration aggregator 330 is configured to apply the principles of this invention to assess the network configuration 320 to determine a set of policy-dependent ranges 340 for each criteria of the policies contained in the network configuration 320. Optionally, default ranges 335 are provided to define, for example, the 'global' ranges that are used to initialize the set of ranges for each criteria parameter, as discussed above with regard to block 210 of FIG. 2.

The determined sets of policy-dependent ranges 340, such as tables 170, 180, 191, 192, and 193 of FIG. 1, are provided to one or more network analysis tools 350, to facilitate identification of each combination of parameter ranges for which each different policy, or set of policies, applies.

Optionally, these sets of policy-dependent ranges 340 are provided to one or more test generators 360 that are configured to create a set of tests that are structured to exercise the network 300 in the tool 350 for each combination of the policy-dependent ranges 340. Co-pending U.S. patent application Ser. No. 11/505,171, "ANALYZING SECURITY COMPLIANCE WITHIN A NETWORK", filed 16 Aug. 2006 for Pradeep Singh, Ankit Agarwal, Alain Cohen, and Venuprakash Barathan, and incorporated by reference herein, teaches a method and system that uses a security policy database that identifies the intended security policies within a network to generate test traffic that is configured to test each defined security policy, and simulates the propagation of this traffic on a model of the network. The model of the network includes the configuration data associated with each device, and thus, if devices are properly configured to enforce the intended security policies, the success/failure of the simulated test traffic will conform to the intended permit/deny policy of each connection. Differences between the simulated message propagation and the intended security policies are reported to the user, and diagnostic tools are provided to facilitate identification of the device configuration data that accounts for the observed difference. Additionally, if a network's current security policy is unknown, test traffic is generated to reveal the actual policy in effect, to construct a baseline intended security policy. The principles disclosed herein can be applied to the teachings of this copending application to define a security policy database that is certain to cover each different combination of policies being applied in a complex network, without exhaustively testing each different combination of criteria values.

Using the example of FIG. 1, the tests will be configured to generate messages from a source address in each of the five source address ranges of table 170 to a destination address in each of the five destination addresses of table 180. Each combination of source and destination address will have an expected permit/deny result at each of the firewalls FW2 102 and FW3 103 in the network of FIG. 1, and the tests are structured to verify that an overall expected result of communications between nodes is achieved.

For example, the test generator 360 will generate a test message from a source address within the range of 0.0.0.0-10.1.1.255 (171 of FIG. 1) to a destination address within the range of 0.0.0.0-10.0.255.255 (first entry in 180 of FIG. 1). Based on the example policies of tables 120, 130 of FIG. 1, this message should be denied at both FW2 and FW3. Another test message would include a source address within the range of 10.1.2.0-10.1.2.13 (172 of FIG. 1) and destination address 10.1.0.58 (third entry of table 180). This message should be permitted to pass through firewall FW3, but denied passage through firewall FW2. The only test message of the twenty five different combinations (5 sources×5 destinations) that should pass through both FW2 and FW3 is a message from source address 10.1.2.14 (173 of FIG. 1) to destination address 10.1.0.58 (third entry of table 180 of FIG. 1). Thus, by generating twenty-five messages from node DMZ to node DataCenter of FIG. 1, the efficacy of firewalls FW2 and FW3 for appropriately permitting or denying messages for the entire range of $2^{32}$ source addresses×$2^{32}$ destination addresses is verified.

It will be recognized that in addition to verification that an expected policy is achieved, the tests provided by the test generator 360 can also be used to determine the policies that will be enforced between nodes in a complex network. That is, the results of attempting to transmit a message in each of the policy-dependent ranges will determine the overall policy that is applied for messages between nodes in each of the policy-dependent ranges, regardless of whether a set of expected results are provided a priori.

Figure 4A:
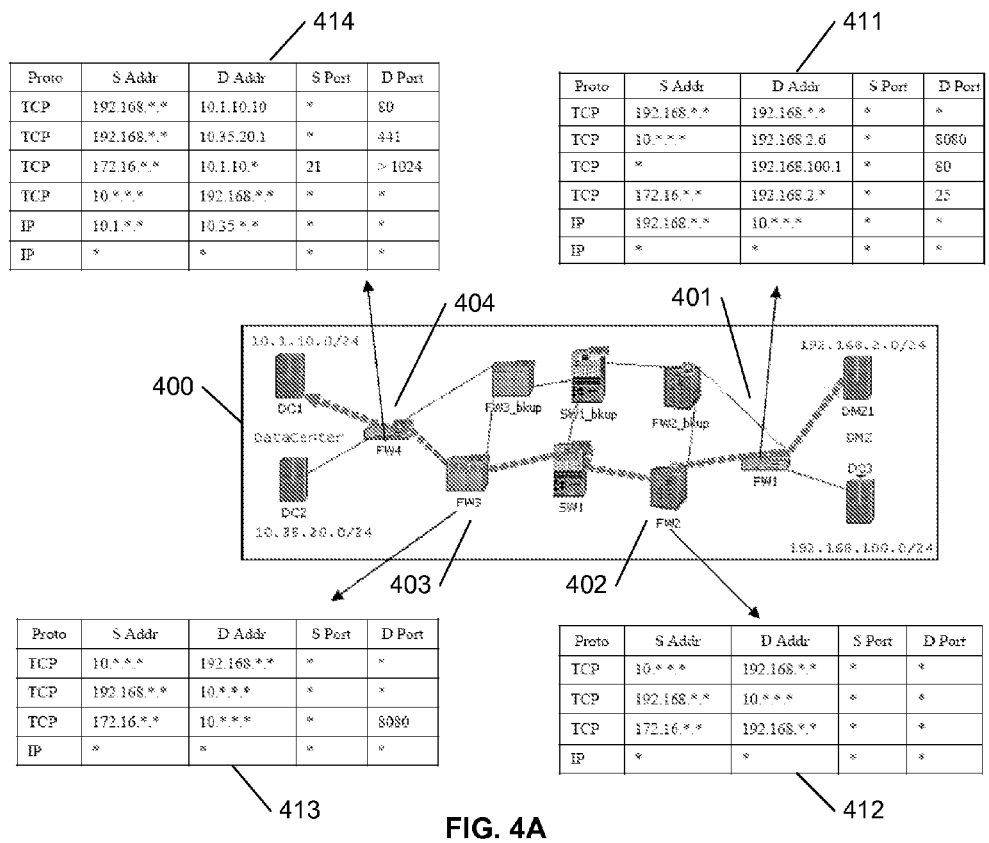

FIGS. 4A and 4B illustrate an example of the techniques of this invention being applied to a more complex network arrangement 400. In this example, four firewalls 401, 402, 403, and 404 are used, with corresponding configurations 411, 412, 413 and 414.

An application of the method of FIG. 2 to the policies for three of the criteria parameters (source address, destination address, and destination port) contained in these configurations 411-414 produce the set of ranges for each parameter illustrated at 450, 460, and 470, respectively. A similar set of ranges (not illustrated) are provided for the remaining criteria parameters (source port and protocol). As illustrated, the source addresses specified in the configurations 411-414 result in a partitioning of the source address space into nine policy-dependent ranges; the destination addresses into nineteen policy-dependent ranges; and the destination ports into ten policy-dependent ranges. The source ports will be partitioned into three (0-20, 21, 22-65535) policy-dependent ranges, and the protocol into two (IP and TCP) policy-dependent ranges. Thus, a verification of the overall policy effected between nodes of the network can be verified and/or determined by a combination of 2*9*19*3*10 (10,260) different messages, as compared to the total number $2*2^{32}*2^{32}*2^{16}*2^{16}$ ($2^{97}$) of possible combinations of protocol, source address, destination address, source port, and destination port parameters.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in FIG. 2, the loop 215-280 applies the range segregation processing to each defined policy. Optionally, a pre-processing of the policies can be performed to identify each uniquely defined range, and the loop 215-280 could be configured to apply the range segregation to each unique range, rather than each policy, thereby eliminating the processing of redundant policies that have no effect on the resultant policy-dependent ranges. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method embodied on a network analysis system that includes:
   collecting, at the network analysis system, configuration data corresponding to a configuration of devices on a network, the configuration data including a plurality of data flow policies that include one or more criteria for enabling each policy;
   processing, by the network analysis system, the plurality of policies for at least one of the criteria to identify a set of ranges within the criteria, wherein all elements within each range of the criteria are subject to a common set of policies;
   providing the set of ranges for use by a network analysis tool to facilitate analysis of the policies for each range; and
   performing an analysis of the network by analyzing at least one element within each non-empty range;
   wherein each policy includes a defined range of the criteria, and the set of ranges corresponds to a set of:
   non-null intersections of each defined range and each other defined range,
   non-null intersections of an inverse of each defined range and each other defined range, and
   non-null intersections of an inverse of each defined range and an inverse of each other defined range.

2. The method of claim 1, wherein the criteria include a source address criteria and a destination address criteria.

3. The method of claim 2, wherein the source address criteria includes a source IP address criteria, and the destination address criteria includes a destination IP address criteria.

4. The method of claim 3, wherein the source address criteria includes a source port criteria, and the destination address criteria includes a destination port criteria.

5. The method of claim 4, wherein the criteria includes a protocol criteria.

6. The method of claim 1, wherein the criteria includes a source port criteria and a destination port criteria.

7. The method of claim 6, wherein the criteria includes a protocol criteria.

8. The method of claim 1, wherein the criteria includes a protocol criteria.

9. The method of claim 1, wherein the criteria includes a location criteria.

10. The method of claim 9, wherein the location criteria include a source location criteria and a destination location criteria.

11. The method of claim 1, wherein identifying the set of ranges within the criteria includes:
    identifying a first determined range corresponding to an intersection of a first defined range associated with the criteria of a first policy and a second defined range associated with the criteria of a second policy,
    identifying a second determined range corresponding to an intersection of the first defined range and an inverse of the second defined range,
    identifying a third determined range corresponding to an intersection of the second defined range and an inverse of the first defined range,
    identifying a fourth determined range corresponding to an intersection of the inverse of the first defined range and the inverse of the second defined range, and
    setting the set of ranges to include the first, second, third, and fourth defined ranges.

12. The method of claim 1, including generating a test sequence that tests at least one element within each range.

13. The method of claim 1, including performing an analysis of the network by analyzing a combination of at least one element within each range of each criteria.

14. The method of claim 1, including generating a test sequence that tests a combination of at least one element within each range of each criteria.

15. The method of claim 1, wherein the policies include at least one of:
    security policies, routing policies, and Quality of Service (QoS) policies.

16. The method of claim 1, wherein the configuration data is user-defined.

17. The method of claim 1, including obtaining at least a part of the configuration data from one or more of the devices of the network.

18. The method of claim 1, including performing the analysis of the policies of each range to validate the configuration data.

19. The method of claim 18, including providing at least a part of the configuration data to one or more of the devices of the network.

20. The method of claim 19, wherein at least a part of the configuration data includes proposed configuration data for one or more of the devices, and the method includes comparing the proposed configuration data to existing configuration data of the one or more of the devices.

21. A method embodied on a network analysis system that includes:
    collecting, at the network analysis system, configuration data corresponding to a configuration of devices on a network, the configuration data including a plurality of data flow policies that include one or more criteria for enabling each policy;
    processing, by the network analysis system, the plurality of policies for at least one of the criteria to identify a set of ranges within the criteria, wherein all elements within each range of the criteria are subject to a common set of policies; and providing the set of ranges for use by a network analysis tool to facilitate analysis of the policies for each range;

wherein each policy includes a defined range of the criteria, forming a plurality of defined ranges, and identifying the set of ranges within the criteria includes:

initializing the set of ranges to a first defined range in the plurality of defined ranges, adding an inverse of the first defined range to the set of ranges, and for each remaining defined range of the plurality of defined ranges:
  initializing a set of prior ranges to the set of ranges,
  initializing the set of ranges to a null set, and
  for each prior range in the set of prior ranges:
    adding an intersection of the prior range and the defined range to the set of ranges, and
    adding an intersection of the prior range and an inverse of the defined range to the set of ranges.

22. The method of claim 21, wherein the plurality of defined ranges corresponds to a plurality of uniquely defined ranges.

23. The method of claim 21, including generating a test sequence that tests the common set of properties within each range.

24. A program stored on a non-transitory computer readable media that is configured to cause a processor to:
  read configuration data corresponding to a configuration of devices on a network, the configuration data including a plurality of data flow policies that include one or more criteria for enabling each policy;
  process the plurality of policies for at least one of the criteria to identify a set of ranges within the criteria, wherein all elements within each range of the criteria are subject to a common set of policies; and
  perform an analysis of the network by analyzing at least one element within each non-empty range;
  wherein each policy includes a defined range of the criteria, and the set of ranges corresponds to a set of:
    non-null intersections of each defined range and each other defined range,
    non-null intersections of an inverse of each defined range and each other defined range, and
    non-null intersections of an inverse of each defined range and an inverse of each other defined range.

25. The program of claim 24, wherein each policy includes a defined range of the criteria, forming a plurality of defined ranges, and identifying the set of ranges within the criteria includes:
  initializing the set of ranges to a first defined range in the plurality of defined ranges,
  adding an inverse of the first defined range to the set of ranges, and
  for each remaining defined range of the plurality of defined ranges:
    initializing a set of prior ranges to the set of ranges,
    initializing the set of ranges to a null set, and
    for each prior range in the set of prior ranges:
      adding an intersection of the prior range and the defined range to the set of ranges,
      adding an intersection of the prior range and an inverse of the defined range to the set of ranges.

26. The program of claim 24, wherein the policies include at least one of:
  security policies, routing policies, and Quality of Service (QoS) policies.

27. The program of claim 24, wherein the program causes the processor to generate a test sequence that tests the common set of policies within each non-empty range.

28. A program stored on a non-transitory computer readable media that is configured to cause a processor to:
  read configuration data corresponding to a configuration of devices on a network, the configuration data including a plurality of data flow policies that include one or more criteria for enabling each policy;
  process the plurality of policies for at least one of the criteria to identify a set of ranges within the criteria, wherein all elements within each range of the criteria are subject to a common set of policies; and
  provide the set of ranges for use by a network analysis tool to facilitate analysis of the policies for each range,
  wherein identifying the set of ranges within the criteria includes:
  identifying a first determined range corresponding to an intersection of a first defined range associated with the criteria of a first policy and a second defined range associated with the criteria of a second policy,
  identifying a second determined range corresponding to an intersection of the first defined range and an inverse of the second defined range,
  identifying a third determined range corresponding to an intersection of the second defined range and an inverse of the first defined range,
  identifying a fourth determined range corresponding to an intersection of the inverse of the first defined range and the inverse of the second defined range, and
  setting the set of ranges to include the first, second, third, and fourth defined ranges.

29. The program of claim 28, wherein the program causes the processor to generate a test sequence that tests the common set of policies within each non-empty range.

* * * * *